(12) United States Patent
Miyazawa (10) Patent No.: US 7,420,746 B2
(45) Date of Patent: Sep. 2, 2008

(54) ZOOM LENS SYSTEM AND IMAGE PICKUP APPARATUS HAVING THE SAME

(75) Inventor: Nobuyuki Miyazawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/943,336

(22) Filed: Nov. 20, 2007

(65) Prior Publication Data

US 2008/0151383 A1    Jun. 26, 2008

(30) Foreign Application Priority Data

Dec. 22, 2006    (JP)    ............... 2006-345588

(51) Int. Cl.
*G02B 15/14* (2006.01)
(52) U.S. Cl. ...................... 359/687; 359/686
(58) Field of Classification Search ................. 359/686, 359/687
See application file for complete search history.

(56) References Cited

U.S. PATENT DOCUMENTS

| | | | |
|---|---|---|---|
| 5,638,216 A | 6/1997 | Horiuchi | |
| 6,577,450 B2 * | 6/2003 | Hamano et al. | ............. 359/687 |
| 6,751,029 B2 | 6/2004 | Horiuchi | |
| 6,972,909 B2 | 12/2005 | Hamano | |

FOREIGN PATENT DOCUMENTS

| | | |
|---|---|---|
| JP | 05-060971 | 3/1993 |
| JP | 08-304700 | 11/1996 |
| JP | 2000-121941 | 4/2000 |
| JP | 2003-295053 | 10/2003 |
| JP | 2005-242014 | 9/2005 |

* cited by examiner

*Primary Examiner*—William C Choi
(74) *Attorney, Agent, or Firm*—Canon U.S.A. Inc I.P. Div (57) ABSTRACT

A zoom lens system, which has a high zoom ratio while having a high optical performance, includes, in order from an object side to an image side, a first lens unit having a positive optical power, a second lens unit having a negative optical power, a third lens unit having a positive optical power, and a fourth lens unit having a positive optical power. The second lens unit and the fourth lens unit move during zooming. Lens elements constituting the first lens unit and the second lens unit are appropriately set.

5 Claims, 10 Drawing Sheets

ZOOM LENS SYSTEM AND IMAGE PICKUP APPARATUS HAVING THE SAME

BACKGROUND OF THE INVENTION

1. Field of the Invention

The present invention relates to a zoom lens system.

2. Description of the Related Art

The market has desired a zoom lens for use in a photographic optical system of an image pickup apparatus having a high zoom ratio and a high optical performance in the entire zoom range.

In particular, in recent years, the market has desired a method for recording a still image with a high image quality with a video camera that primarily captures a moving image. Under these circumstances, it is desired that a zoom lens have a high optical performance.

Conventionally, a four-unit zoom lens is known which includes a first lens unit having a positive refractive power, a second lens unit having a negative refractive power, a third lens unit having a positive refractive power, and a fourth lens unit having a positive refractive power, in order from an object side to an image side.

Of such four-unit zoom lenses, a so-called rear focus type four-unit zoom lens is known that moves a second lens unit to vary magnification and moves a fourth lens unit to compensate for movement of an image plane caused by the variation of magnification and to perform focusing (see Japanese Patent Application Laid-Open No. 08-304700, Japanese Patent Application Laid-Open No. 2000-121941, and Japanese Patent Application Laid-Open No. 2003-295053, which corresponds to U.S. Pat. No. 6,751,029).

A rear focus type four-unit zoom lens performs focusing by moving a lens unit that is relatively small-sized and relatively light in weight. Accordingly, such a rear focus type four-unit zoom lens requires only a small drive force for driving the lens unit. This enables a quick and rapid focusing.

Japanese Patent Application Laid-Open No. 05-060971, which corresponds to U.S. Pat. No. 5,638,216, and Japanese Patent Application Laid-Open No. 2005-242014, which corresponds to U.S. Pat. No. 6,972,909, each discuss a rear focus type four-unit zoom lens having a high zoom ratio while having a high optical performance in the entire zoom range.

In the above-described rear focus type four-unit zoom lens, a configuration of a second lens unit, which functions to vary magnification, is significant to achieve a high optical performance while securing a high zoom ratio.

In rear focus type four-unit zoom lenses discussed in Japanese Patent Application Laid-Open No. 08-304700, Japanese Patent Application Laid-Open No. 2000-121941, and Japanese Patent Application Laid-Open No. 2003-295053, the second lens unit includes a lens having a negative refractive power in which an absolute value of a refractive power of a surface on the object side is larger than that on the image side, and a cemented lens including a bi-concave lens having a negative refractive and a lens having a positive refractive power, in order from the object side to the image side.

With respect to the zoom lens having such a configuration, it is difficult to correct aberration on a cemented surface of the cemented lens when the second lens unit has an increased refractive power. Accordingly, it is difficult to achieve a high optical performance in the entire zoom range.

In rear focus type four-unit zoom lenses discussed in Japanese Patent Application Laid-Open No. 05-060971 and Japanese Patent Application Laid-Open No. 2005-242014, the second lens unit includes three single lenses and does not include a cemented lens, thus achieving a high optical performance in the entire zoom range.

Particularly, in a rear focus type four-unit zoom lens discussed in Japanese Patent Application Laid-Open No. 2005-242014, a positive lens included in the second lens is made of a material having an Abbe number smaller than "20" and a refractive index higher than "1.9". Accordingly, the refractive power of the second lens unit can be intensified to a level at which the zoom ratio as high as "20" can be secured. Accordingly, a high optical performance can be achieved in the entire zoom range.

It is useful in achieving a further higher zoom ratio to provide an appropriate principal point distance between the first lens unit and the second lens unit. In this regard, the rear principal point position can be brought closer to the object side or to bring the front principal point position closer to the image side.

In the rear focus type four-unit zoom lenses discussed in Japanese Patent Application Laid-Open No. 05-060971 and Japanese Patent Application Laid-Open No. 2005-242014, air is provided between the second and third lenses included in the second lens unit. Thus, a high zoom ratio can be achieved, while achieving a high optical performance in the entire zoom range. Furthermore, the diameter of a front lens element can be made small. If the lens configuration of the first lens unit is appropriately set, it becomes easier to achieve a high zoom ratio because the rear principal point position can be further brought closer to the object side.

Particularly, if a shape factor of two positive lenses included in the first lens unit is appropriately set, it becomes further easier to bring the rear principal point position closer to the object side, which is useful in achieving a high zoom ratio while achieving a high optical performance in the entire zoom range.

SUMMARY OF THE INVENTION

The present invention is directed to a zoom lens that can be used in an image pickup apparatus (e.g., a video camera, a silver-halide camera, a digital still camera, and other image pickup apparatus as known by one of ordinary skill in the relevant arts).

The present invention is also directed to a zoom lens system that can achieve a high optical performance in the entire zoom range while achieving a high zoom ratio.

According to an aspect of the present invention, a zoom lens system includes, in order from an object side to an image side, a first lens unit having a positive optical power, a second lens unit having a negative optical power, a third lens unit having a positive optical power, and a fourth lens unit having a positive optical power. The second lens unit and the fourth lens unit move during zooming. The first lens unit consists of, in order from the object side to the image side, a first lens element having a negative optical power, a second lens element having a positive optical power, and a third lens element having a positive optical power. The second lens unit consists of, in order from the object side to the image side, a fourth lens element having a negative optical power, a fifth lens element having a negative optical power, and a sixth lens element having a positive optical power. A focal length of the second lens element (f12), a focal length of the third lens element (f13), a radius of curvature of a surface on the object side of the third lens element (R13a), and a radius of curvature of a surface on the image side of the third lens element (R13b) satisfy the following conditions:

$$0.36 < f12/f13 < 0.51, \text{ and}$$

$3.9 < (R13b+R13a)/(R13b-R13a) < 6.0$.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate some exemplary embodiments and features of the invention and, together with the description, serve to explain some of the principles of the invention.

DETAILED DESCRIPTION OF THE EMBODIMENTS

Various exemplary embodiments of the present invention will now be described in detail with reference to the drawings. It should be noted that the relative arrangement of the components, the numerical expressions, and numerical values set forth in these embodiments do not limit the scope of the present invention unless it is specifically stated otherwise.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F-number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., aberration), a reduction of the error and/or a correction of the error is intended.

Now, a zoom lens system and an image pickup apparatus having the zoom lens system will be described below.

Figure 1:
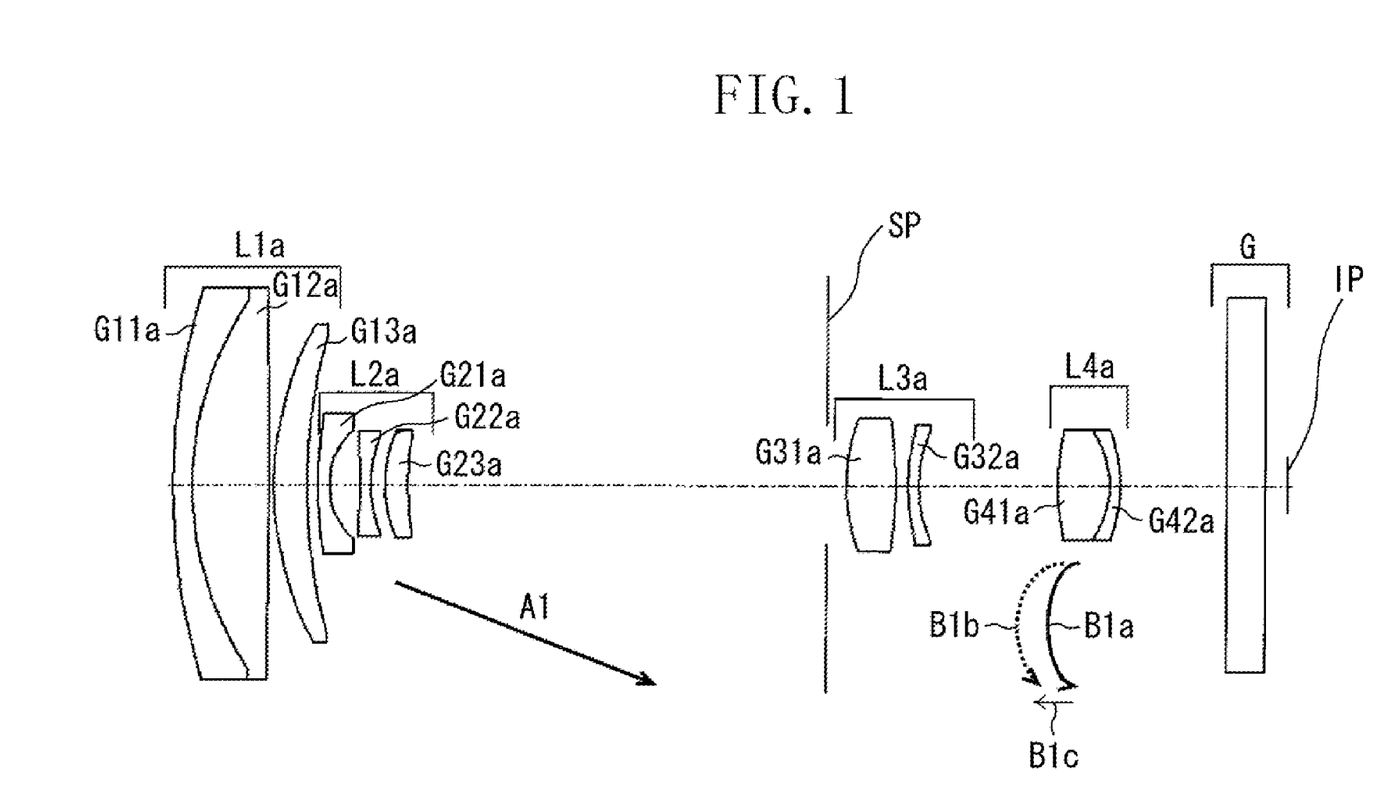
FIG. 1 is a cross section of a zoom lens system according to a first exemplary embodiment of the present invention.
Figure 2:
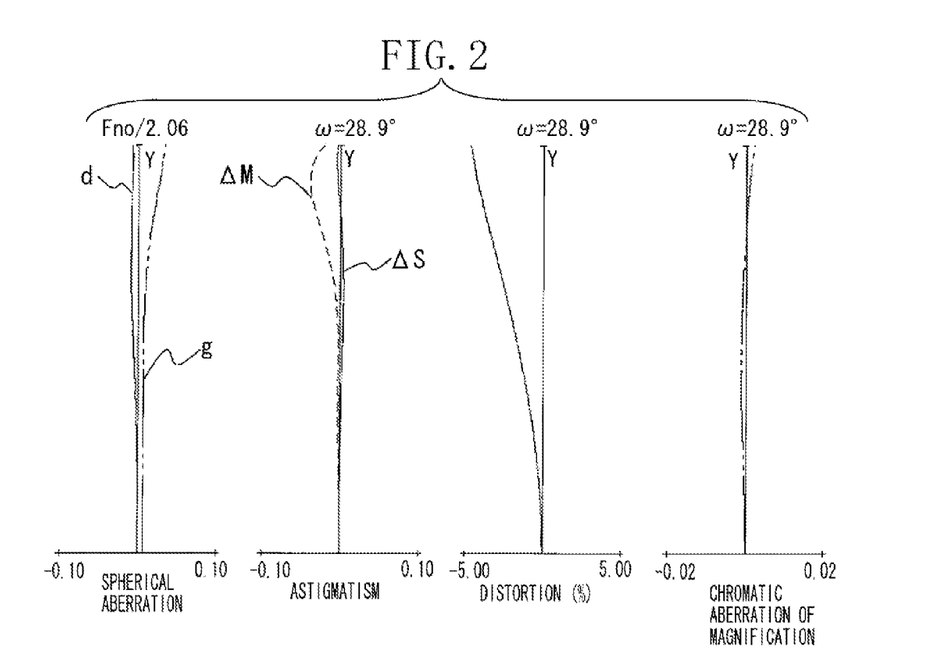
FIG. 2 is a chart illustrating various aberrations occurring in the zoom lens system at a wide-angle end according to the first exemplary embodiment of the present invention.
Figure 3:
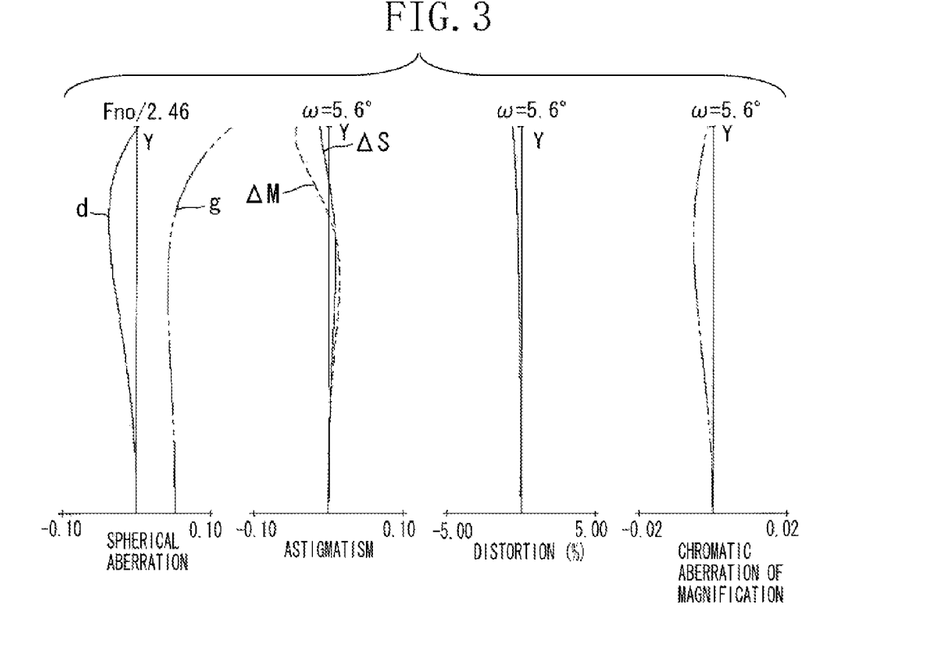
FIG. 3 is a chart illustrating various aberrations occurring in the zoom lens system at a middle focal length position according to the first exemplary embodiment of the present invention.
Figure 4:
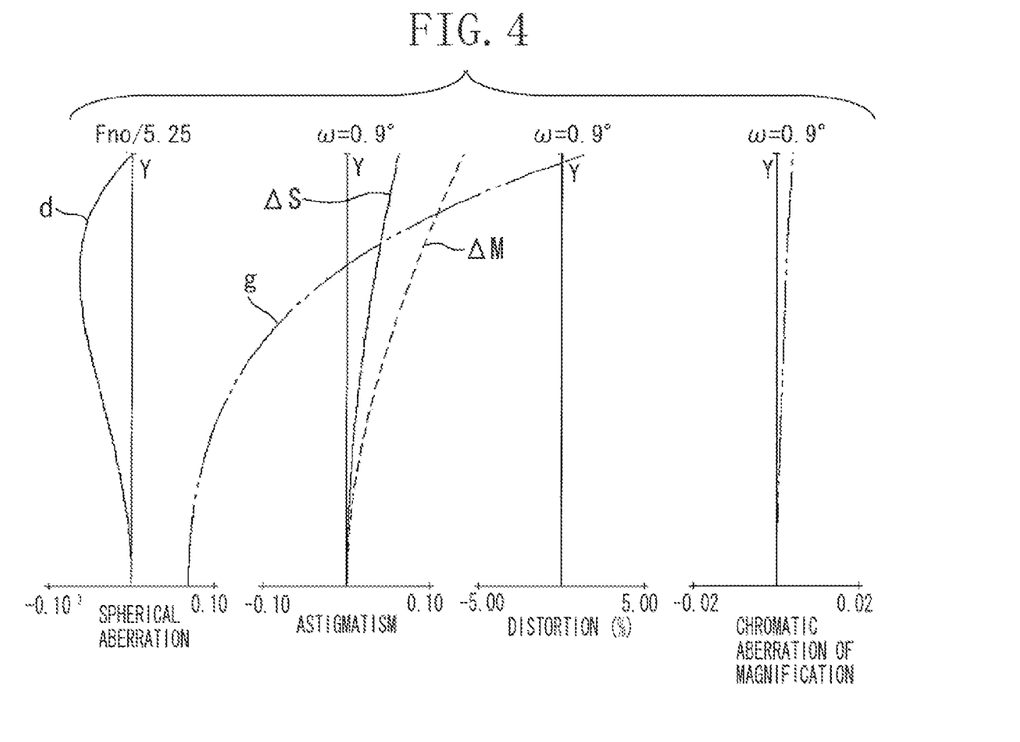
FIG. 4 is a chart illustrating various aberrations occurring in the zoom lens system at a telephoto end according to the first exemplary embodiment of the present invention.

FIG. 1 is a diagram illustrating a cross section of a zoom lens system at the wide-angle end (a short focal length end) according to a first exemplary embodiment of the present invention. FIG. 2, FIG. 3, and FIG. 4 respectively illustrate an aberration chart at the wide-angle end, at a middle focal length position, and at the telephoto end (a long focal length end) of the zoom lens system according to the first exemplary embodiment.

Figure 5:
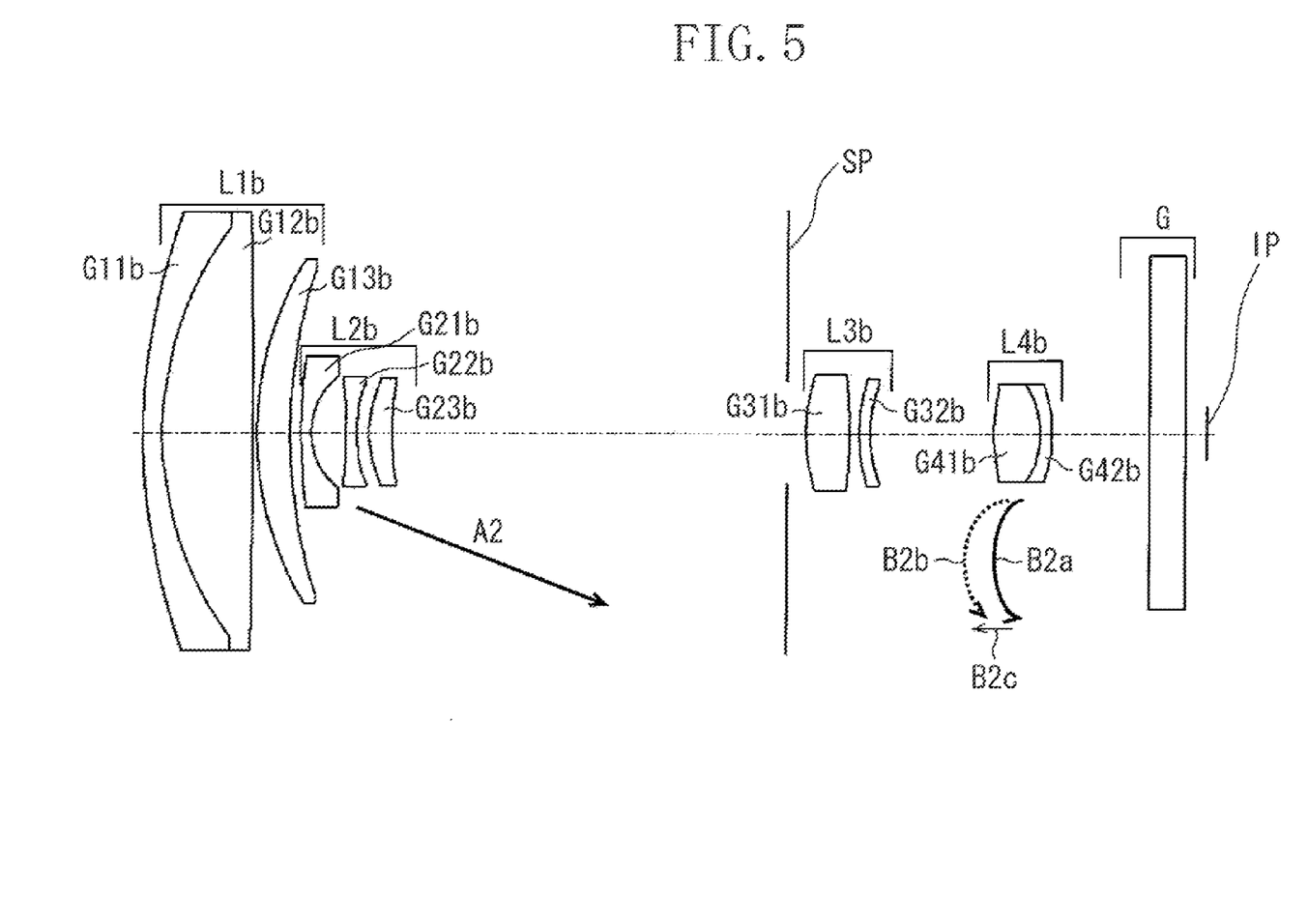
FIG. 5 is a cross section of a zoom lens system according to a second exemplary embodiment of the present invention.
Figure 6:
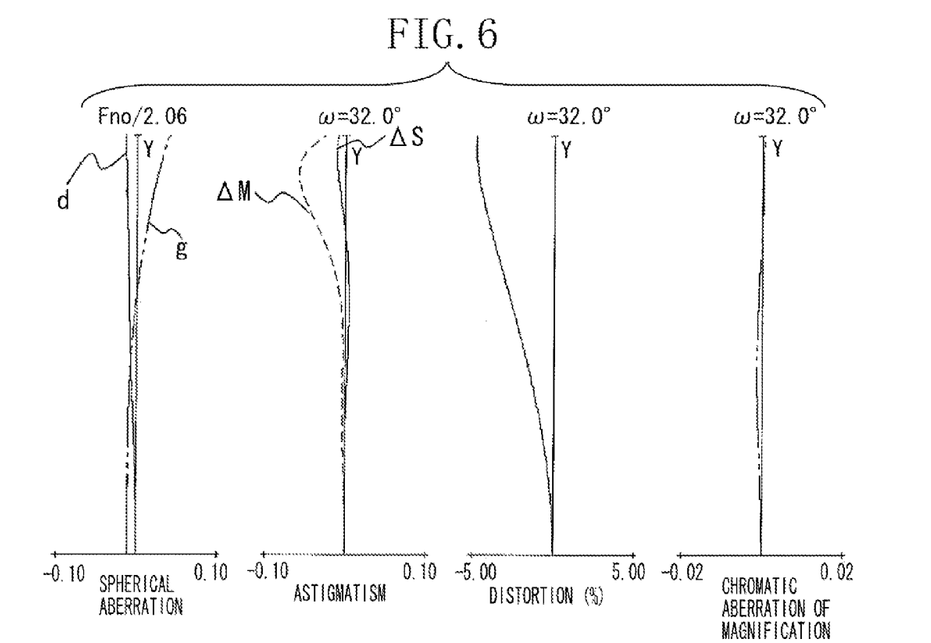
FIG. 6 is a chart illustrating various aberrations occurring in the zoom lens system at a wide-angle end according to the second exemplary embodiment of the present invention.
Figure 7:
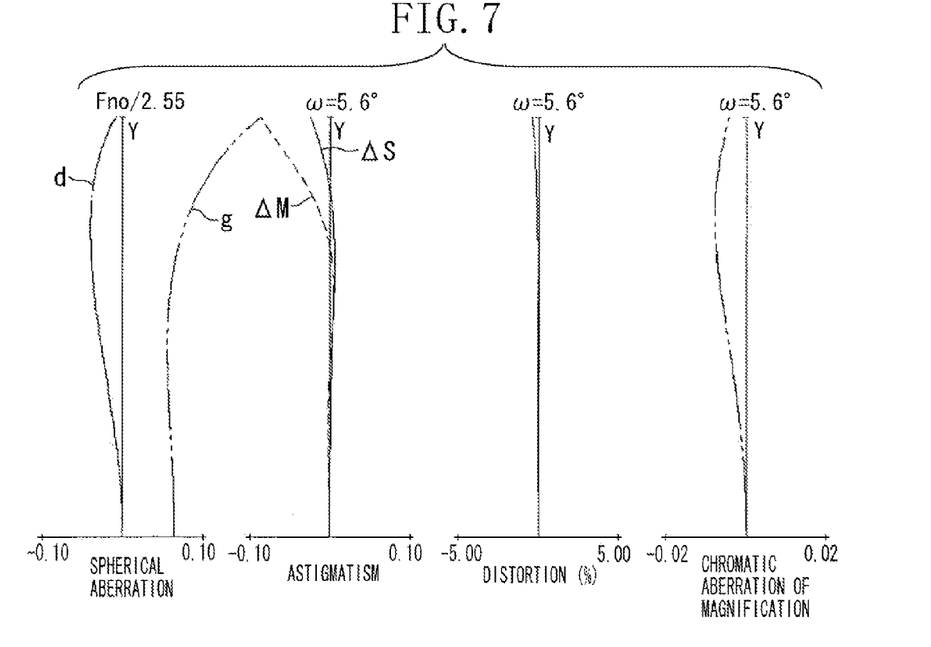
FIG. 7 is a chart illustrating various aberrations occurring in the zoom lens system at a middle focal length position according to the second exemplary embodiment of the present invention.
Figure 8:
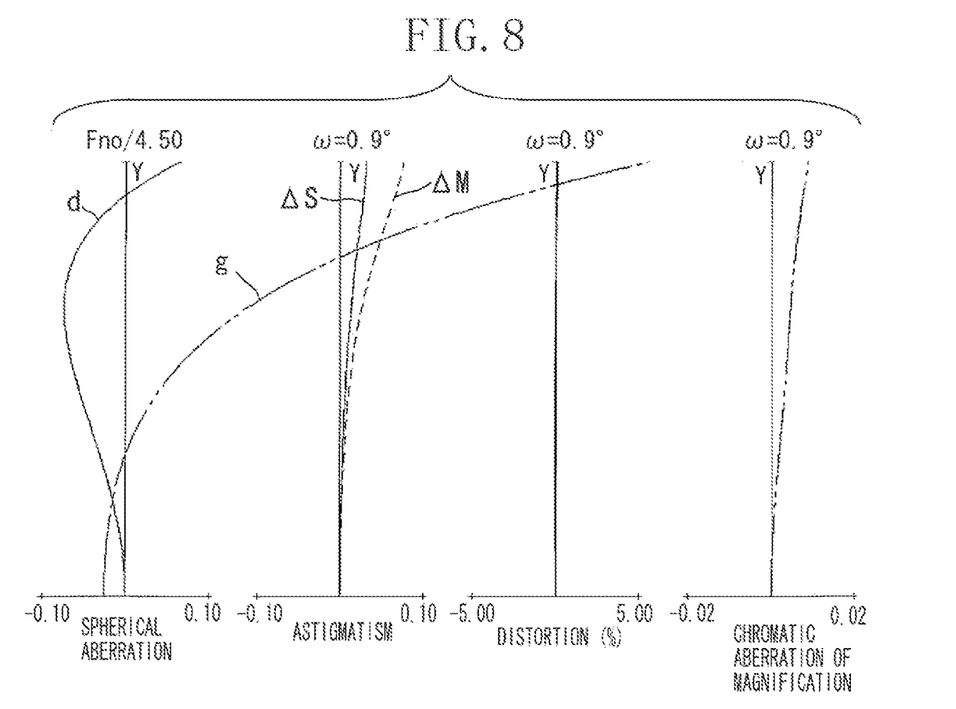
FIG. 8 is a chart illustrating various aberrations occurring in the zoom lens system at a telephoto end according to the second exemplary embodiment of the present invention.

FIG. 5 is a diagram illustrating a cross section of the zoom lens system at the wide-angle end according to a second exemplary embodiment of the present invention. FIG. 6, FIG. 7, and FIG. 8 respectively illustrate an aberration chart at the wide-angle end, at a middle focal length position, and at a telephoto end of the zoom lens system according to the second exemplary embodiment.

Figure 9:
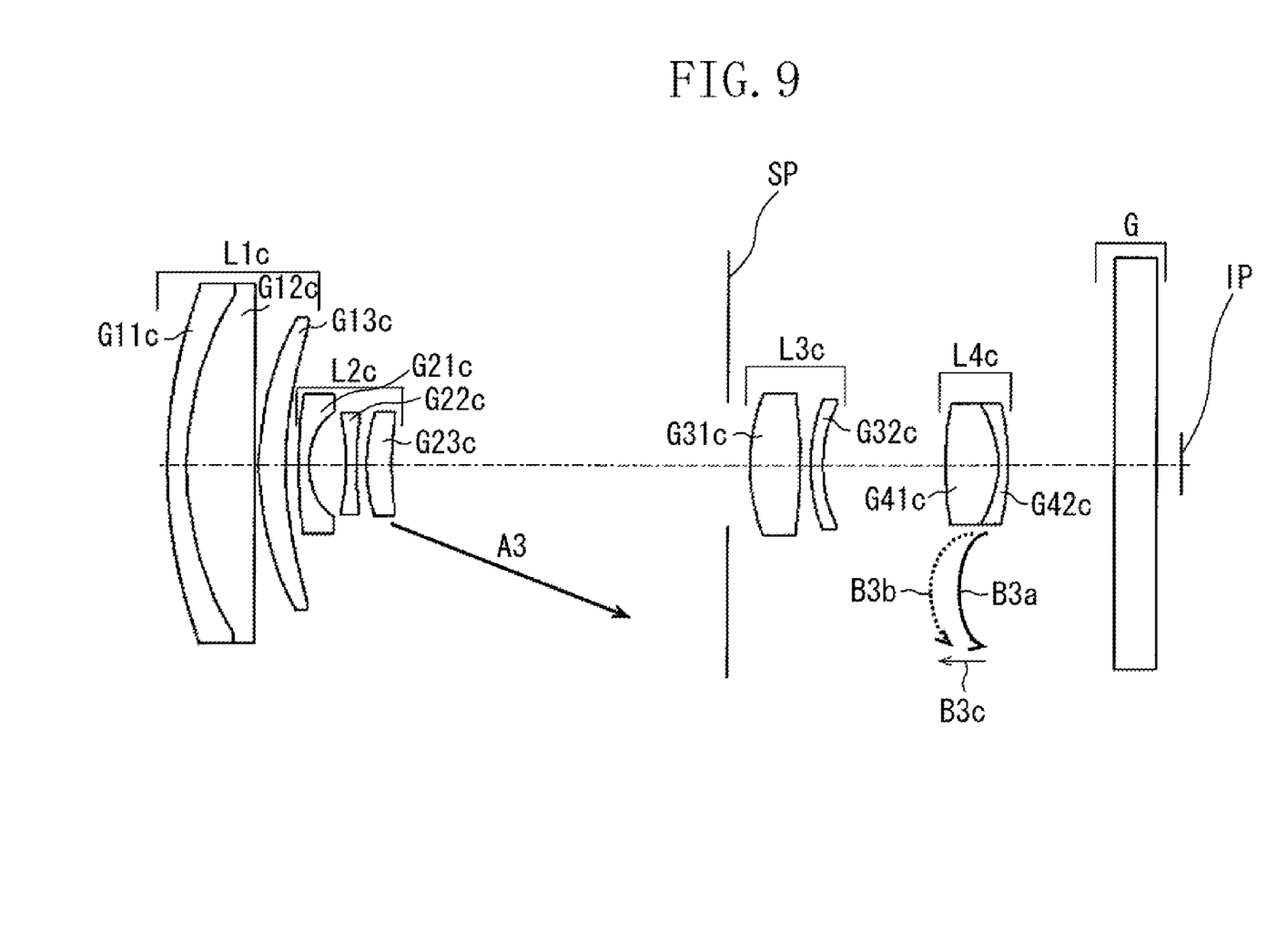
FIG. 9 is a cross section of a zoom lens system according to a third exemplary embodiment of the present invention.
Figure 10:
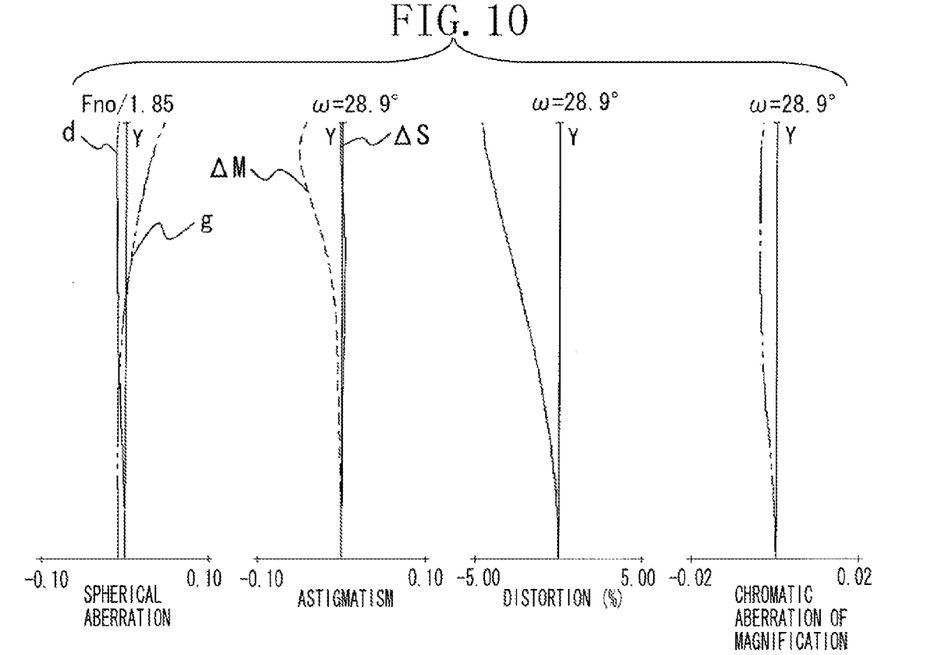
FIG. 10 is a chart illustrating various aberrations occurring in the zoom lens system at a wide-angle end according to the third exemplary embodiment of the present invention.
Figure 11:
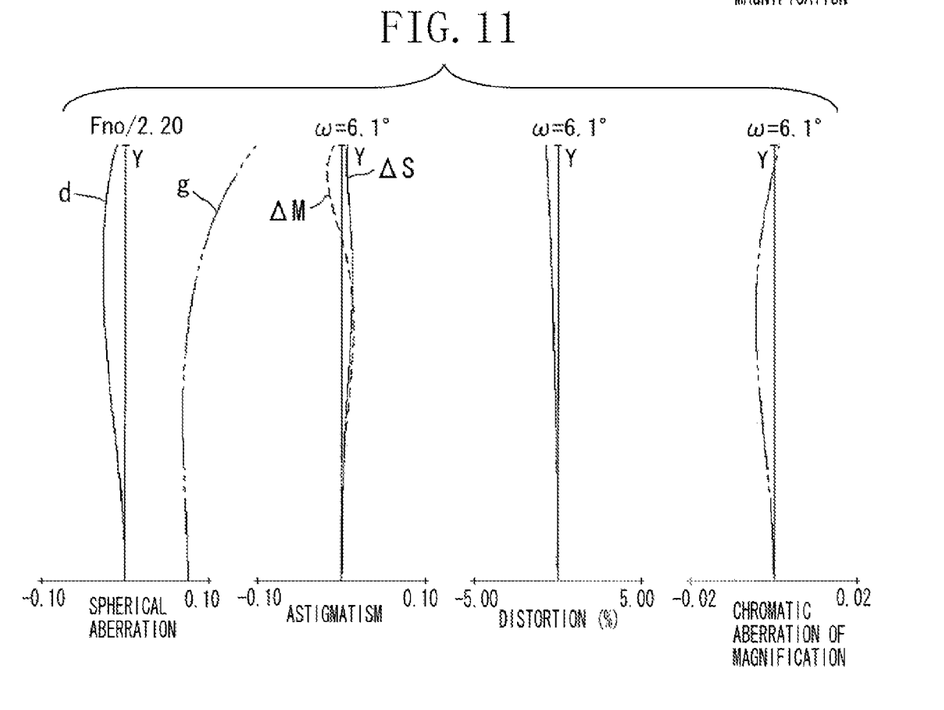
FIG. 11 is a chart illustrating various aberrations occurring in the zoom lens system at a middle focal length position according to the third exemplary embodiment of the present invention.
Figure 12:
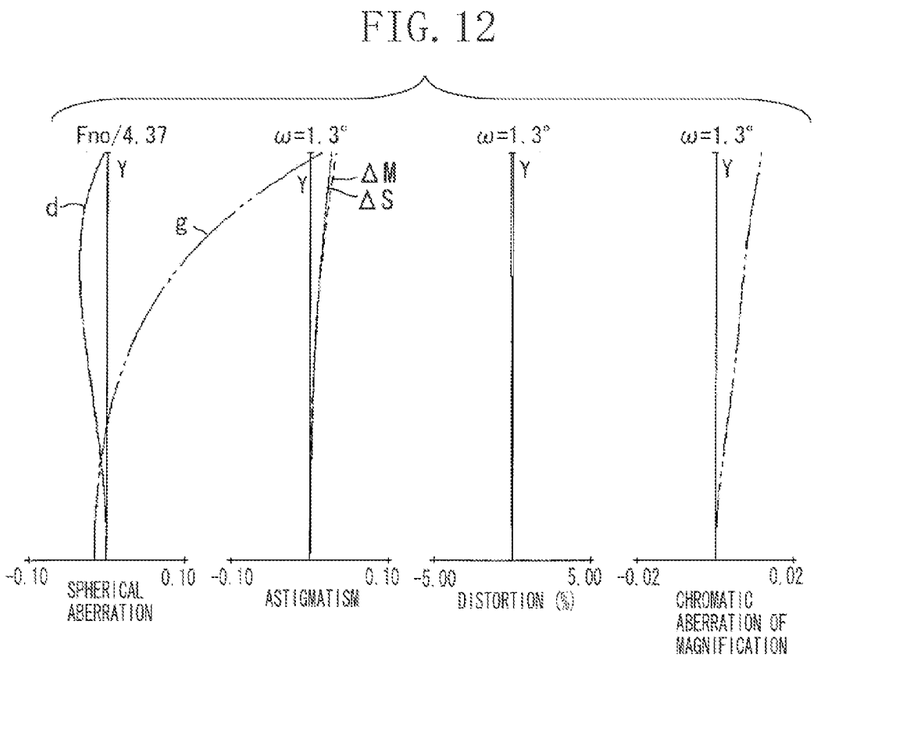
FIG. 12 is a chart illustrating various aberrations occurring in the zoom lens system at a telephoto end according to the third exemplary embodiment of the present invention.

FIG. 9 is a diagram illustrating a cross section of the zoom lens system at the wide-angle end according to a third exemplary embodiment of the present invention. FIG. 10, FIG. 11, and FIG. 12 respectively illustrate an aberration chart at the wide-angle end, at a middle focal length position, and at a telephoto end of the zoom lens system according to the third exemplary embodiment of the present invention.

Figure 13:
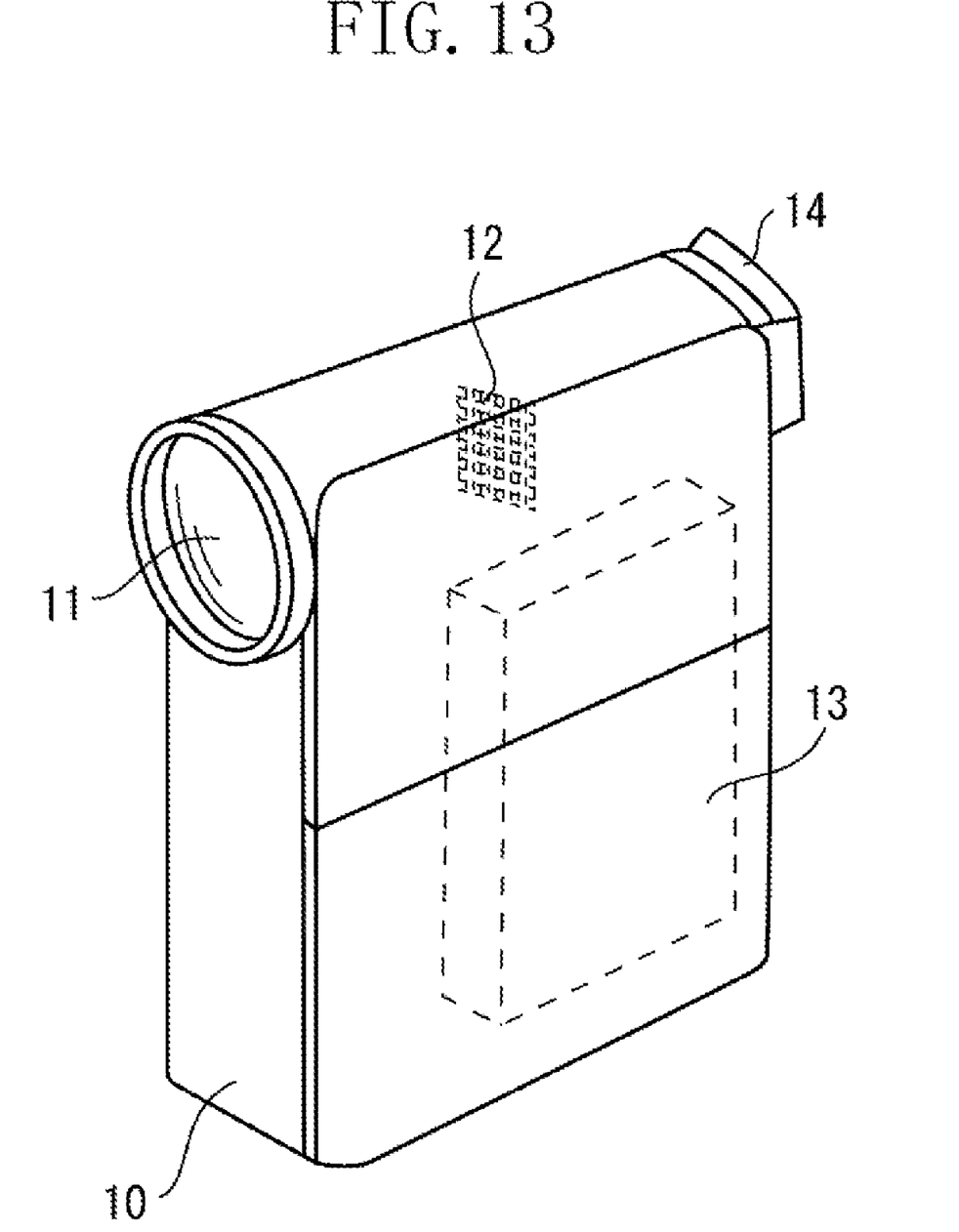
FIG. 13 is a diagram illustrating components of an image pickup apparatus (video camera) according to an exemplary embodiment of the present invention.

FIG. 13 is a diagram illustrating components of a video camera (image pickup apparatus) having a zoom lens system according to an exemplary embodiment of the present invention.

The zoom lens system according to each of the exemplary embodiments is a photographic lens system, which can be used with an image pickup apparatus such as a video camera, a digital still camera, and a silver-halide film camera. In each of the diagrams illustrating a cross section of a zoom lens system (FIGS. 1, 5, and 9), an object side (front side) is shown at the left-hand portion, and an image side (back side) is shown at the right-hand portion. It is to be noted here that in the case of using the zoom lens system according to an exemplary embodiment as a projection lens for a projector, in each of the diagrams illustrating a cross section of a zoom lens system (FIGS. 1, 5, and 9), a screen side (front side) is shown at the left-hand portion, and an original image side (back side) is shown at the right-hand portion.

The zoom lens system according to an exemplary embodiment includes a first lens unit L1$a$-$c$ having a positive refractive power (optical power=an inverse of a focal length), a second lens unit L2$a$-$c$ having a negative refractive power, a third lens unit L3$a$-$c$ having a positive refractive power, and a fourth lens unit L4$a$-$c$ having a positive refractive power, in order from the object side to the image side. The zoom lens system can further include an aperture stop SP. The aperture stop Sp is disposed at the object side of the third lens unit L3a-c.

In each of the diagrams illustrating a cross section of a zoom lens system, "G" denotes an optical block that is equivalent to an optical filter, a face plate, a crystal low-pass filter, and an infrared-ray cut filter, or other type of optical filter as known by one of ordinary skill in the relevant arts. In addition, in each of diagrams illustrating a cross section of a zoom lens system, "IP" denotes an image plane. The image plane IP is, when the zoom lens system according to an exemplary embodiment is used as a photographic optical system of a video camera or a digital still camera, equivalent to an imaging plane of a solid-state image sensor, such as a charge-coupled device (CCD) sensor or a complementary metal-oxide semiconductor (CMOS) sensor. The image plane IP is, when the zoom lens is used as a photographic optical system of a silver-halide film camera, equivalent to a film surface.

In addition, in each of the aberration charts (FIGS. 2 through 4, FIGS. 6 through 8, and FIGS. 10 through 12), "d" and "g" respectively denote d-line and g-line light. "ΔM" and "ΔS" respectively denote a meridional image plane and a sagittal image plane. Chromatic aberration of magnification is represented with g-line light.

"ω" denotes a half angle of view, and "Fno" denotes an F-number. The Y-axis in the spherical aberration's graph is entrance pupil radius, and the Y-axis in the astigmatism's, distortion's and chromatic aberration of magnification's graphs is image height.

In each of the exemplary embodiments described below, the wide-angle end and the telephoto end are zooming positions at which a lens unit for varying magnification (the second lens unit L2a-c) is positioned at respective ends of a mechanically movable range thereof on an optical axis.

In addition, in each of the exemplary embodiments described below, the second lens unit L2a-c moves towards the image side with a locus indicated by an arrow A1-3 to vary magnification during zooming from the wide-angle end to the telephoto end. At the same time, the fourth lens unit L4a-c moves with a locus convex towards the object side to compensate for movement of an image plane caused by the variation of magnification.

The zoom lens system according to an exemplary embodiment is a rear focus type four-unit zoom lens in which the fourth lens unit L4a-c moves along the optical axis during focusing. In each of the diagrams illustrating a cross section of a zoom lens system, a full line curve B1a-3a and a dotted curve B1b-3b for the fourth lens unit L4a-c denote a locus of movement for compensating for movement of an image plane caused by the variation of magnification during focusing on an infinitely distant object and a closest object, respectively.

The fourth lens unit L4a-c moves with a locus convex towards the object side, thus effectively utilizing a space between the third lens unit L3a-c and the fourth lens unit L4a-c. Thus, an exemplary embodiment of the present invention can effectively reduce the length of the entire zoom lens system.

During focusing from an infinitely distant object to a closest object, the fourth lens unit L4a moves forward as indicated by an arrow B1c-3c.

In the zoom lens system according to an exemplary embodiment of the present invention, the first lens unit L1a-c, the third lens unit L3a-c, and the aperture stop SP do not move along the optical axis during zooming and during focusing. However, the first lens unit L1a-c, the third lens unit L3a-c, and the aperture stop SP can move along the optical axis to correct aberration.

The first lens unit L1a-c includes three lens elements, namely, in order from the object side to the image side, a first meniscus lens element G11a-c having a negative refractive power and having a convex surface facing the object side, a second lens element G12a-c having a positive refractive power, and a third meniscus lens element G13a-c having a positive refractive power and having a convex surface facing the object side. The first lens element G11a-c and the second lens element G12a-c are cemented together to form a cemented lens.

As will be described below, the focal length and the lens shape of the second lens element G12a-c and the third lens element G13a-c are appropriately set to achieve a high zoom ratio while maintaining a high optical performance.

In the zoom lens system having a zoom type of each exemplary embodiment, the lens configuration of the second lens unit L2a-c has a significant influence on the variation of aberration occurring during zooming.

In an exemplary embodiment, the second lens unit L2a-c includes, in order from the object side to the image side, a fourth lens element G21a-c having a negative refractive power in which an absolute value of a refractive power of a surface on the image side is larger than that on the object side, a fifth lens element G22a-c having a negative refractive power and having a concave surface facing the object side, and a sixth lens element G23a-c having a positive refractive power in which an absolute value of a refractive power of a surface on the object side is larger than that on the image side. The surface of the fifth lens element G22a-c on the image side and the surface of the sixth lens element G23a-c on the object side are located away from each other on the optical axis, thus providing a space of air between the fifth lens element G22a-c and the sixth lens element G23a-c. With such a lens configuration, an exemplary embodiment of the present invention can reduce or suppress aberration variation or distortion variation during zooming.

The third lens unit L3a-c includes, in order from the object side to the image side, a seventh biconvex lens element G31a-c having a positive refractive power and an eighth meniscus lens element G32a-c having a negative refractive power and having a convex surface facing the object side.

With the above-described lens configuration, an exemplary embodiment of the present invention can correct spherical aberration and axial chromatic aberration at the wide-angle end and can further reduce curvature of field in the entire zoom range from the wide-angle end to the telephoto end.

The fourth lens unit L4a-c includes, in order from the object side to the image side, a ninth biconvex lens element G41a-c having a positive refractive power and a tenth meniscus lens element G42a-c having a negative refractive power and having a convex surface facing the image side.

With the above-described lens constitution, an exemplary embodiment of the present invention can appropriately correct spherical aberration and axial chromatic aberration at the wide-angle end and can further reduce or suppress variation of chromatic aberration of magnification in the entire zoom range. In addition, an exemplary embodiment of the present invention can reduce or suppress aberration variation occurring during focusing with the fourth lens unit L4a-c.

Now, various exemplary embodiments of the present invention having the above-described configuration will be described below.

As described above, a zoom lens system according to an exemplary embodiment of the present invention includes, in order from the object side to the image side, a first lens unit L1a-c having a positive refractive power, a second lens unit L2a-c having a negative refractive power, a third lens unit L3a-c having a positive refractive power, and a fourth lens unit L4a-c having a positive refractive power. The second lens unit L2a-c and the fourth lens unit L4a-c move during zooming.

The first lens unit L1a-c includes, in order from the object side to the image side, a first lens element G11a-c having a negative refractive power, a second lens element G12a-c having a positive refractive power, and a third lens element G13a-c having a positive refractive power.

The second lens unit L2a-c includes, in order from the object side to the image side, the fourth lens element G21a-c having a negative refractive power, the fifth lens element G22a-c having a negative refractive power, and the sixth lens element G23a-c having a positive refractive power.

In the fourth lens element G21a-c, an absolute value of a refractive power of a surface on the image side is larger than that on the object side. The fifth lens element G22a-c of the second lens unit L2a-c has a concave surface facing the object side. In the sixth lens element G23a-c, an absolute value of a refractive power of a surface on the object side is larger than that on the image side.

The surface on the image side of the fifth lens element G22a-c and the surface on the object side of the sixth lens element G23a-c are located away from each other on the optical axis across a space of air. That is, the fifth lens element G22a-c and the sixth lens element G23a-c do not form a cemented lens.

In a zoom lens system according to an exemplary embodiment of the present invention, a focal length of the second lens element G12a-c (f12), a focal length of the third lens element G13a-c (f13), a radius of curvature of a surface on the object side of the third lens element G13a-c (R13a), and a radius of curvature of a surface on the image side of the third lens element G13a-c (R13b) satisfy the following conditions:

$$0.36 < f12/f13 < 0.51 \quad (1)$$

$$3.9 < (R13b+R13a)/(R13b-R13a) < 6.0 \quad (2).$$

Here, the focal length for each of the second lens element G12a-c and the third lens element G13a-c is calculated supposing that the second lens element G12a-c and the third lens element G13a-c are separated from each other and placed in a medium having a refractive index of 1 (e.g., air) if they are constituent elements of a cemented lens.

If the zoom lens system according to an exemplary embodiment satisfies the conditional expressions (1) and (2), the zoom lens system can achieve a high zoom ratio. If the upper limit value of the conditional expression (1) is exceeded, the positive refractive power of the third lens element G13a-c becomes too large, which may cause the rear principal point position of the first lens unit L1a-c to move towards the image side.

In this case, the distance between the first lens unit L1a-c and the second lens unit L2a-c becomes too short, which causes the focal length of the zoom lens system at the telephoto end to be short. Thus, it becomes difficult to achieve a high zoom ratio.

On the other hand, if the lower limit value of the conditional expression (1) is exceeded, the positive refractive power of the third lens element G13a-c becomes too small. In this case, it is difficult to obtain a sufficient effect of aberration correction with the third lens element G13a-c.

If the upper limit value of the conditional expression (2) is exceeded, the positive refractive power of a surface of the third lens element G13a-c on the object side and the negative refractive power of a surface of the third lens element G13a-c on the image side become too large. In this case, it is difficult to correct high-order aberrations. On the other hand, if the lower limit value of the conditional expression (2) is exceeded, the negative refractive power of a surface of the third lens element G13a-c on the image side becomes too small. In this case, the rear principal point position of the first lens unit L1a-c may move towards the image side. Accordingly, it is difficult to achieve a high zoom ratio.

Further, in solving various technical problems occurring with respect to a zoom lens system, the zoom lens system according to an exemplary embodiment of the present invention can satisfy the following conditional expressions.

The focal lengths of the fourth lens element G21a-c and the fifth lens element G22a-c (f21, f22), a radius of curvature of a surface on the image side of the fifth lens element G22a-c (R22b), and a radius of curvature of a surface on the object side of the sixth lens element G23a-c (R23a) can satisfy the following conditionals:

$$0.43 < f21/f22 < 0.79 \quad (3)$$

$$0.95 < R22b/R23a < 2.75 \quad (4).$$

If the zoom lens system according to an exemplary embodiment of the present invention satisfies the above-described conditional expression (3), aberration (aberration variation) can be sufficiently corrected particularly at the wide-angle end.

If the upper limit value of the conditional expression (3) is exceeded, it is difficult to correct astigmatism at the wide-angle end. On the other hand, if the lower limit value of the conditional expression (3) is exceeded, it is difficult to correct distortion at the wide-angle end.

If the zoom lens system according to an exemplary embodiment of the present invention satisfies the above-described conditional expression (4), an aberration variation can be sufficiently corrected during zooming. The conditional expression (3) provides a condition for a useful arrangement of the refractive powers of the fourth lens element G21a-c and the fifth lens element G22a-c. Furthermore, the conditional expression (4) provides a condition for sufficiently correcting variation of curvature of field occurring during zooming, by securing a sufficient ratio between the radii of curvature R22b and R23a for each lens surface.

If the upper limit value of the conditional expression (4) is exceeded, a negative curvature of field becomes too large. On the other hand, if the lower limit value of the conditional expression (4) is exceeded, a positive curvature of field becomes too large.

A refractive index (N23) and an Abbe number (ν23) of a material of the sixth lens element G23a-c can satisfy the following conditions:

$$\nu 23 < 20 \quad (5)$$

$$N23 > 1.9 \quad (6).$$

The conditional expression (5) provides a condition for effectively correcting chromatic aberration in the case where one positive lens is used in the three lens elements constituting the second lens unit L2a-c. If the upper limit value of the conditional expression (5) is exceeded, a sufficient effect of achromatism cannot be obtained in the second lens unit L2a-c. Thus, in this case, a large chromatic aberration variation may occur during zooming.

The conditional expression (6) provides a condition for effectively correcting aberration variation in the case where one positive lens is used in the three lens elements constituting the second lens unit L2a-c. If the lower limit value of the conditional expression (6) is exceeded, it becomes difficult to sufficiently correct a variation of coma occurring during zooming.

An imaging magnification of the second lens unit L2a-c at the wide-angle end (β2w) and an imaging magnification of the second lens unit L2a-c at the telephoto end (β2t) can satisfy the following condition:

$$39.0 < \beta 2t/\beta 2w < 84.7 \tag{7}$$

The conditional expression (7) provides a condition for a tolerable range of variation of the imaging magnification of the second lens unit L2a-c during zooming.

If the upper limit value of the conditional expression (7) is exceeded, it becomes difficult to correct aberration in the entire zoom range, although it is useful in achieving a high zoom ratio. On the other hand, if the lower limit value of the conditional expression (7) is exceeded, it becomes difficult to secure a desired zoom ratio.

In order to further correct aberration and to decrease an amount of aberration variation during zooming in an exemplary embodiment, the range of the values in the conditional expressions (1) through (7) can be altered as follows:

$$0.38 < f12/f13 < 0.49 \tag{1a}$$

$$4.1 < (R13b+R13a)/(R13b-R13a) < 5.7 \tag{2a}$$

$$0.45 < f21/f22 < 0.75 \tag{3a}$$

$$1.00 < R22b/R23a < 2.60 \tag{4a}$$

$$v23 < 19 \tag{5a}$$

$$N23 > 1.91 \tag{6a}$$

$$42.0 < \beta 2t/\beta 2w < 80.0 \tag{7a}$$

It is to be noted that in each of the exemplary embodiments of the present invention, a lens unit such as a converter lens or a close-up lens can be arranged on the object side of the first lens unit L1a-c or the image side of the fourth lens unit L4a-c.

Numerical examples 1 through 3 that respectively correspond to the first through the third exemplary embodiments are set forth below. In each of the numerical examples 1 through 3, "i" denotes the order of a surface from the object side, "Ri" denotes a radius of curvature of the i-th optical surface (an i-th surface), "Di" denotes an axial interval between the i-th surface and the (i+1)th surface, "Ni" and "vi" respectively denote a refractive index and an Abbe number of the i-th optical material with respect to d-line light. In addition, "f" denotes the focal length, "Fno" denotes the F-number, and "ω" denotes the half angle of view.

In addition, in each of the numerical examples 1 through 3, two surfaces closest to the image side (a surface having a radius of curvature of ∞) are surfaces that constitute an optical block G.

In addition, "X" denotes a displacement from a surface vertex along the optical axis in a position at a height "h" from the optical axis, "R" denotes a paraxial radius of curvature, "k" denotes a conic constant, and each of "A'", "B'", "C'", and "D'" denotes an aspheric coefficient. The aspheric shape is expressed as follows:

$$X = \frac{(1/R)h^2}{1+\sqrt{1-(1+k)(h/R)^2}} + A'h^3 + B'h^5 + C'h^7 + D'h^9$$

Moreover, "e-Z" denotes "×10$^{-Z}$". Furthermore, the relationship between each conditional expression described above and values in each numerical example is set forth in Table 1.

Numerical Example 1
f = 2.66-91.98  Fno = 2.06-5.25  2ω = 57.8°-1.8°

| | | | |
|---|---|---|---|
| R1 = 37.258 | D1 = 1.05 | N1 = 1.805181 | v1 = 25.4 |
| R2 = 18.480 | D2 = 4.21 | N2 = 1.696797 | v2 = 55.5 |
| R3 = −651.893 | D3 = 0.25 | | |
| R4 = 18.345 | D4 = 1.80 | N3 = 1.696797 | v3 = 55.5 |
| R5 = 29.550 | D5 = Variable | | |
| R6 = 27.500 | D6 = 0.60 | N4 = 1.834807 | v4 = 42.7 |
| R7 = 4.076 | D7 = 1.72 | | |
| R8 = −45.434 | D8 = 0.60 | N5 = 1.804000 | v5 = 46.6 |
| R9 = 7.660 | D9 = 0.75 | | |
| R10 = 7.275 | D10 = 1.29 | N6 = 1.922860 | v6 = 18.9 |
| R11 = 17.489 | D11 = Variable | | |
| R12 = Stop | D12 = 1.10 | | |
| R13 = 9.929 | D13 = 2.75 | N7 = 1.583126 | v7 = 59.4 |
| R14 = −21.867 | D14 = 0.65 | | |
| R15 = 12.114 | D15 = 0.60 | N8 = 1.846660 | v8 = 23.9 |
| R16 = 7.614 | D16 = Variable | | |
| R17 = 13.393 | D17 = 2.90 | N9 = 1.518229 | v9 = 58.9 |
| R18 = −5.225 | D18 = 0.60 | N10 = 1.846660 | v10 = 23.9 |
| R19 = −8.241 | D19 = Variable | | |
| R20 = ∞ | D20 = 2.13 | N11 = 1.516330 | v11 = 64.1 |
| R21 = ∞ | | | |

| | Focal Length | | |
|---|---|---|---|
| Variable Interval | 2.66 | 15.08 | 91.98 |
| D5 | 0.65 | 15.94 | 22.49 |
| D11 | 23.14 | 7.85 | 1.30 |
| D16 | 7.68 | 3.62 | 11.45 |
| D19 | 5.97 | 10.04 | 2.21 |

Aspheric Coefficients

| | | | |
|---|---|---|---|
| R13: | k = −1.18213e+00 | A' = 0.00000e+00 | B' = 2.41938e−06, |
| | C' = −4.67393e−07 | D' = −1.84465e−08 | |
| R14: | k = −1.33778e+01 | A' = 0.00000e+00 | B' = −1.79477e−06 |
| | C' = 0.00000e+00 | D' = 0.00000e+00 | |

Numerical Example 2
f = 2.35-92.79  Fno = 2.06-4.50  2ω = 64.0°-1.8°

| | | | |
|---|---|---|---|
| R1 = 36.609 | D1 = 1.10 | N1 = 1.846660 | v1 = 23.9 |
| R2 = 19.994 | D2 = 5.32 | N2 = 1.696797 | v2 = 55.5 |
| R3 = −517.036 | D3 = 0.20 | | |
| R4 = 19.228 | D4 = 1.95 | N3 = 1.712995 | v3 = 53.9 |
| R5 = 30.836 | D5 = Variable | | |
| R6 = 32.447 | D6 = 0.60 | N4 = 1.882997 | v4 = 40.8 |
| R7 = 4.188 | D7 = 2.04 | | |
| R8 = −29.415 | D8 = 0.60 | N5 = 1.712995 | v5 = 53.9 |
| R9 = 8.471 | D9 = 0.74 | | |
| R10 = 7.381 | D10 = 1.30 | N6 = 1.922860 | v6 = 18.9 |
| R11 = 14.649 | D11 = Variable | | |
| R12 = Stop | D12 = 1.10 | | |
| R13 = 10.789 | D13 = 2.55 | N7 = 1.583126 | v7 = 59.4 |
| R14 = −31.463 | D14 = 0.54 | | |
| R15 = 9.849 | D15 = 0.60 | N8 = 1.846660 | v8 = 23.9 |
| R16 = 7.483 | D16 = Variable | | |
| R17 = 13.608 | D17 = 2.74 | N9 = 1.563839 | v9 = 60.7 |
| R18 = −4.836 | D18 = 0.70 | N10 = 1.846660 | v10 = 23.9 |

-continued

Numerical Example 2
f = 2.35-92.79 Fno = 2.06-4.50 2ω = 64.0°-1.8°

| R19 = −8.380 | D19 = Variable | | |
|---|---|---|---|
| R20 = ∞ | D20 = 2.13 | N11 = 1.516330 | ν11 = 64.1 |
| R21 = ∞ | | | |

| | Focal Length | | |
|---|---|---|---|
| Variable Interval | 2.35 | 14.91 | 92.79 |
| D5 | 0.65 | 16.49 | 22.65 |
| D11 | 23.10 | 7.26 | 1.10 |
| D16 | 7.31 | 3.50 | 10.80 |
| D19 | 5.69 | 9.49 | 2.19 |

Aspheric Coefficients

| R13: | k = −9.91076e−01 | A' = 0.00000e+00 | B' = −2.11851e−05 |
|---|---|---|---|
| | C' = 2.76243e−06 | D' = −2.40692e−07 | |
| R14: | k = −2.34787e+01 | A' = 0.00000e+00 | B' = −5.33175e−06 |
| | C' = 1.54483e−06 | D' = −2.45265e−07 | |

Numerical Example 3
f = 2.66-65.63 Fno = 1.85-4.37 2ω = 57.9°-2.6°

| R1 = 25.805 | D1 = 0.95 | N1 = 1.922860 | ν1 = 18.9 |
|---|---|---|---|
| R2 = 16.574 | D2 = 3.41 | N2 = 1.696797 | ν2 = 55.5 |
| R3 = −12275.062 | D3 = 0.20 | | |
| R4 = 15.199 | D4 = 1.35 | N3 = 1.882997 | ν3 = 40.8 |
| R5 = 21.967 | D5 = Variable | | |
| R6 = 20.561 | D6 = 0.55 | N4 = 1.882997 | ν4 = 40.8 |
| R7 = 3.432 | D7 = 1.89 | | |
| R8 = −11.259 | D8 = 0.50 | N5 = 1.712995 | ν5 = 53.9 |
| R9 = 19.044 | D9 = 0.50 | | |
| R10 = 7.621 | D10 = 1.29 | N6 = 1.922860 | ν6 = 18.9 |
| R11 = 15.575 | D11 = Variable | | |
| R12 = Stop | D12 = 1.10 | | |
| R13 = 9.622 | D13 = 2.53 | N7 = 1.583126 | ν7 = 59.4 |
| R14 = −24.658 | D14 = 0.49 | | |
| R15 = 8.822 | D15 = 0.60 | N8 = 1.846660 | ν8 = 23.9 |
| R16 = 6.574 | D16 = Variable | | |
| R17 = 15.045 | D17 = 2.68 | N9 = 1.696797 | ν9 = 55.5 |
| R18 = −5.495 | D18 = 0.50 | N10 = 1.846660 | ν10 = 23.9 |
| R19 = −12.002 | D19 = Variable | | |
| R20 = ∞ | D20 = 2.13 | N11 = 1.516330 | ν11 = 64.1 |
| R21 = ∞ | | | |

| | Focal Length | | |
|---|---|---|---|
| Variable Interval | 2.66 | 13.82 | 65.63 |
| D5 | 0.60 | 11.66 | 16.40 |
| D11 | 16.90 | 5.84 | 1.10 |
| D16 | 6.20 | 3.10 | 9.39 |
| D19 | 5.40 | 8.50 | 2.21 |

Aspheric Coefficients

| R13: | k = −8.60045e−01 | A' = 0.00000e+00 | B' = −7.27199e−06 |
|---|---|---|---|
| | C' = 1.79924e−06 | D' = −3.91808e−08 | |
| R14: | k = −2.10746e+01 | A' = 0.00000e+00 | B' = 1.56572e−05 |
| | C' = 8.27373e−07 | D' = −1.75531e−08 | |

TABLE 1

| | Numerical Example | | |
|---|---|---|---|
| Condition | 1 | 2 | 3 |
| (1) | 0.397 | 0.414 | 0.465 |
| (2) | 4.27 | 4.31 | 5.49 |

TABLE 1-continued

| | Numerical Example | | |
|---|---|---|---|
| Condition | 1 | 2 | 3 |
| (3) | 0.715 | 0.600 | 0.481 |
| (4) | 1.05 | 1.15 | 2.50 |
| (5) | 18.9 | 18.9 | 18.9 |
| (6) | 1.922860 | 1.922860 | 1.922860 |
| (7) | 59.9 | 77.0 | 43.3 |

As described above, according to an exemplary embodiment of the present invention, a zoom lens system having a zoom ratio of about 25 to about 40 and having a high optical performance in the entire zoom range can be implemented.

Now, an exemplary embodiment of a video camera that uses a zoom lens system according to an exemplary embodiment as a photographic optical system is described below with reference to FIG. 13.

Referring to FIG. 13, the video camera includes a video camera body 10 and a photographic optical system 11. The photographic optical system 11 includes a zoom lens according to an exemplary embodiment of the present invention. The video camera body 10 includes an image sensor (solid-state image sensor) 12, such as a charge-coupled device (CCD) sensor or a complementary metal oxide semiconductor (CMOS) sensor, configured to receive light forming an object image via the photographic optical system 11.

The video camera body 10 further includes a recording unit 13 configured to record information corresponding to an object image photoelectrically converted by the image sensor 12. The video camera body 10 further includes a viewfinder 14 configured to allow a user to observe an object image displayed on a display element (not illustrated). The viewfinder 14 includes a liquid crystal display panel (not illustrated) for displaying an object image formed on the image sensor 12.

With a zoom lens system according to an exemplary embodiment of the present invention applied to an image pickup apparatus, such as a video camera, a small-size image pickup apparatus having a high optical performance can be implemented.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-345588 filed Dec. 22, 2006, which is hereby incorporated by reference herein in its entirety.

What is claimed is:

1. A zoom lens system comprising, in order from an object side to an image side:
   a first lens unit having a positive optical power;
   a second lens unit having a negative optical power;
   a third lens unit having a positive optical power; and
   a fourth lens unit having a positive optical power,
   wherein the first lens unit consists of, in order from the object side to the image side, a first lens element having a negative optical power, a second lens element having a positive optical power, and a third lens element having a positive optical power;
   wherein the second lens unit consists of, in order from the object side to the image side, a fourth lens element having a negative optical power, a fifth lens element having a negative optical power, and a sixth lens element having a positive optical power, wherein an absolute value of an optical power of a surface on the image side of the fourth lens element is larger than an absolute value of an optical power of a surface on the object side of the fourth lens element, wherein the fifth lens element has a concave surface facing the object side, wherein an absolute value of an optical power of a surface on the object side of the sixth lens element is larger than an absolute value of an optical power of a surface on the image side of the sixth lens element, wherein a surface on the image side of the fifth lens element and a surface on the object side of the sixth lens element are located away from each other along an optical axis;

wherein the second lens unit and the fourth lens unit move during zooming, and wherein a focal length of the second lens element (f12), a focal length of the third lens element (f13), a radius of curvature of a surface on the object side of the third lens element (R13$a$), and a radius of curvature of a surface on the image side of the third lens element (R13$b$) satisfy the following conditions:

$0.36 < f12/f13 < 0.51$, and $3.9 < (R13b + R13a)/(R13b - R13a) < 6.0$.

2. The zoom lens system according to claim 1, wherein a focal length of the fourth lens element (f21), a focal length of the fifth lens element (f22), a radius of curvature of a surface on the image side of the fifth lens element (R22$b$), and a radius of curvature of a surface on the object side of the sixth lens element (R23$a$) satisfy the following conditions:

$0.43 < f21/f22 < 0.79$, and $0.95 < R22b/R23a < 2.75$.

3. The zoom lens according to claim 1, wherein a refractive index (N23) and an Abbe number (v23) of a material of the sixth lens element satisfy the following conditions:

$v23 < 20$, and $N23 > 1.9$.

4. The zoom lens according to claim 1, wherein an imaging magnification of the second lens unit at a wide-angle end ($\beta 2w$) and an imaging magnification of the second lens unit at a telephoto end ($\beta 2t$) satisfy the following condition:

$39.0 < \beta 2t/\beta 2w < 84.7$.

5. An image pickup apparatus comprising:
the zoom lens system according to claim 1; and
a solid-state image sensor configured to receive an image formed by the zoom lens system.

* * * * *